(12) United States Patent
Sadayori et al.

(10) Patent No.: US 7,034,101 B2
(45) Date of Patent: **\*Apr. 25, 2006**

(54) POLYCARBODIIMIDE COPOLYMER AND PRODUCTION METHOD THEREOF

(75) Inventors: Naoki Sadayori, Ibaraki (JP); Yuji Hotta, Ibaraki (JP)

(73) Assignee: Nitto Denko Corporation, Osaka (JP)

(\*) Notice: Subject to any disclaimer, the term of this patent is extended or adjusted under 35 U.S.C. 154(b) by 3 days.

This patent is subject to a terminal disclaimer.

(21) Appl. No.: 10/793,213

(22) Filed: Mar. 5, 2004

(65) Prior Publication Data

US 2004/0176547 A1  Sep. 9, 2004

(30) Foreign Application Priority Data

Mar. 7, 2003  (JP)  ............................ P.2003-062523

(51) Int. Cl.
  *C08G 73/10* (2006.01)
  *C08G 18/28* (2006.01)
(52) U.S. Cl. .................... 528/310; 528/44; 528/45; 528/170; 528/322; 528/353; 525/452
(58) Field of Classification Search ................ 528/170, 528/44, 353, 45, 322, 310; 428/473.5; 525/452
  See application file for complete search history.

(56) References Cited

U.S. PATENT DOCUMENTS

| | | | |
|---|---|---|---|
| 3,929,733 A | | 12/1975 | Alberino et al. |
| 4,060,664 A | | 11/1977 | McGuire et al. |
| 4,721,768 A | | 1/1988 | Cassidy et al. |
| 5,357,021 A | | 10/1994 | Tye et al. |
| 6,090,906 A | * | 7/2000 | Amano et al. ............ 528/170 |
| 6,492,484 B1 | * | 12/2002 | Misumi et al. ............ 528/170 |
| 6,846,550 B1 | * | 1/2005 | Matsumura et al. ........ 428/209 |

FOREIGN PATENT DOCUMENTS

| | | |
|---|---|---|
| EP | 0 943 642 A1 | 9/1999 |
| JP | 51-61599 | 5/1976 |
| JP | 61-246245 | 11/1986 |
| JP | 2-292316 | 12/1990 |
| JP | 4-261428 | 9/1992 |
| JP | 5-310877 | 11/1993 |
| JP | 11-322888 | 11/1999 |

OTHER PUBLICATIONS

European Search Report dated Jul. 28, 2004.

\* cited by examiner

*Primary Examiner*—P. Hampton Hightower
(74) *Attorney, Agent, or Firm*—Sughrue Mion, PLLC

(57) ABSTRACT

A polycarbodiimide copolymer which comprises at least one structural unit selected from rubber residues represented by the following formulae (1) and (2) in a number "m":

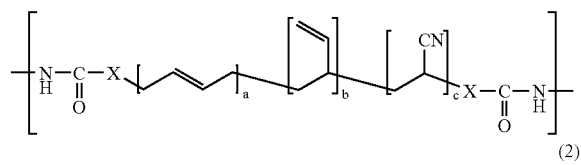

and a structural unit represented by the following formula (3) in a number "n":

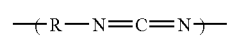

and which comprises on both termini a terminal structural unit derived from a monoisocyanate, wherein m is an integer of 2 or more, n is an integer of 1 or more, m+n is from 3 to 1,500 and m/(m+n) is from 1/1,500 to 1/3. The polycarbodiimide is capable of keeping the inherent heat resistance and also showing excellent flexibility. Films and molding materials having high heat resistance and flexibility can be obtained.

5 Claims, 1 Drawing Sheet

POLYCARBODIIMIDE COPOLYMER AND PRODUCTION METHOD THEREOF

FIELD OF THE INVENTION

This invention relates to a polycarbodiimide having high heat resistance and electric insulation performance, and a production method thereof.

BACKGROUND OF THE INVENTION

Though polycarbodiimide resins are thermosetting resins having excellent heat resistance, they are slightly soluble in various solvents and have low fluidity when melted, so that their mold processing becomes difficult in their practical use. With the aim of improving mold processing ability of such a polycarbodiimide, JP-A-51-61599, JP-A-61-246245, JP-A-4-261428 and the like disclose preparation of a powdery polycarbodiimide using 4,4'-diphenylmethane diisocyanate (MDI hereinafter) and a monoisocyanate. Though such a polycarbodiimide can be molded into a sheet shape by hot pressing, its workability cannot be said high and the moldings are hard and poor in flexibility.

Also, JP-A-2-292316 and JP-A-5-310877 describe a method for producing a polycarbodiimide solution using a specified solvent in carrying out polymerization from tolylene diisocyanate (TDI hereinafter). Though there are descriptions therein stating that the moldability is improved, flexibility of the hardened products is lower than that of the polycarbodiimide obtained from 4,4'-diphenylmethane diisocyanate.

In addition, JP-A-11-322888 and U.S. Pat. No. 5,357,021 disclose that flexibility of a polycarbodiimide is improved by introducing a long chain polyether or a long chain polyester into its molecule through urethane bond, urea bond or the like. However, heat resistance of the polycarbodiimide is sharply reduced by such a modification.

SUMMARY OF THE INVENTION

The object of the present invention is to provide a thermosetting resin polycarbodiimide having high heat resistance and excellent flexibility and also having good workability and moldability and a production method thereof. The present inventors have carried out intensive studies on such an object. As a result, it was found unexpectedly that the introduction of an aliphatic isocyanate in carrying out polymerization using an aromatic diisocyanate and a straight chain aliphatic isocyanate as the starting materials, which was difficult to perform in the prior art, can be achieved by setting the reaction temperature to a low level, so that a polycarbodiimide capable of showing excellent flexibility while keeping high heat resistance can be obtained, thus resulting in the accomplishment of the present invention.

The present invention provides a polycarbodiimide copolymer which comprises at least one structural unit selected from rubber residues represented by the following formulae (1) and (2) in a number "m":

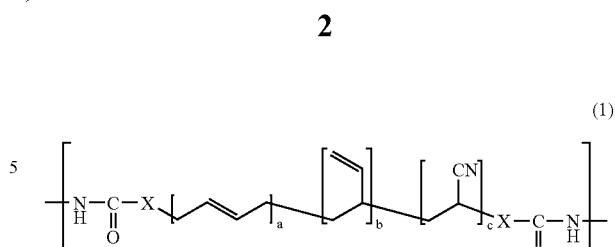

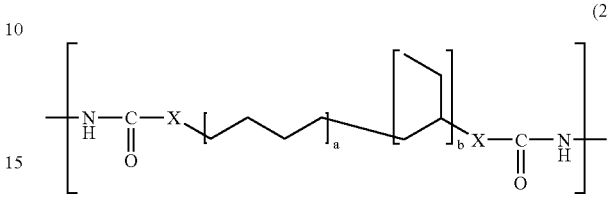

(wherein each of a, b and c is an integer of from 0 to 200, and X represents an alkylene group having from 0 to 5 carbon atoms) and a structural unit represented by the following formula (3) in a number "n":

(wherein R means an alkyl group having from 4 to 20 carbon atoms or an aryl group) and which comprises on each of the both termini a terminal structural unit derived from a monoisocyanate, wherein m is an integer of 2 or more, n is an integer of 1 or more, m+n is from 3 to 1,500 and m/(m+n) is from $1/1{,}500$ to $1/3$, and a production method thereof.

BRIEF DESCRIPTION OF THE DRAWINGS

By way of example and to make the description more clear, reference is made to the accompanying drawing in which.

DETAILED DESCRIPTION OF THE INVENTION

Figure 1:
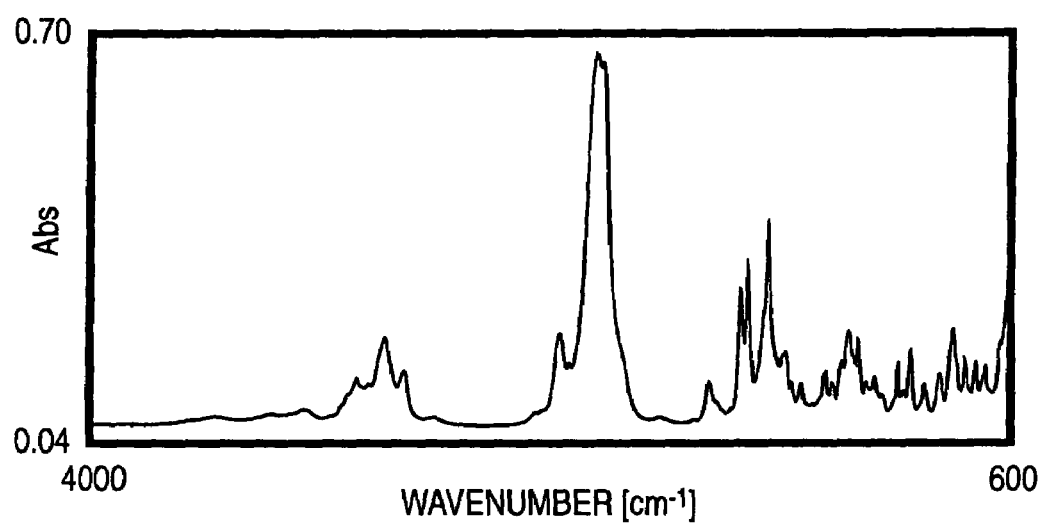
FIG. 1 is an IR absorption spectrum of the polymer obtained in Example 1.

The conventionally known polycarbodiimides solely comprising aromatic compounds were not able to be used as film materials due to their brittleness. Different from the conventional modified carbodiimides, the polycarbodiimide copolymer of the present invention is a thermosetting resin capable of showing excellent flexibility while keeping high heat resistance, so that it can provide films and various molding materials.

Also, as a more preferred embodiment of the polycarbodiimide copolymer of the present invention, a polycarbodiimide copolymer wherein the terminal structural unit of the molecule is a substituted or unsubstituted phenyl group, naphthyl group or alkyl group having from 1 to 10 carbon atoms can be exemplified. In addition, the present invention also provides a polycarbodiimide copolymer solution prepared by dissolving the polycarbodiimide copolymer of the formula (1) in an aprotic organic solvent.

Also, the present invention provides a method for the production of a polycarbodiimide copolymer, which comprises allowing at least one bifunctional liquid rubber selected from liquid rubbers having the repeating structural units represented by the aforementioned formulae (1) and (2), an organic diisocyanate and a monoisocyanate to undergo the reaction in an aprotic solvent in the presence of a catalyst.

In the present specification, "an alkylene group having 0 carbon atom" means a single bond (a direct bond).

The following describes the present invention further in detail. The polycarbodiimide of the present invention is a copolymer containing the structural units (rubber residues) represented by the formulae (1) and (2) and the repeating structural unit represented by the formula (3), at a predetermined ratio in one molecule. That is, this polycarbodiimide contains units (rubber residues) represented by the following formulae (1) and (2) in a number "m":

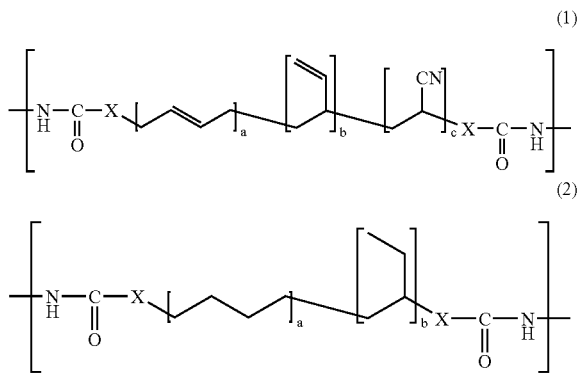

(wherein each of a, b and c is an integer of from 0 to 200, and X represents an alkylene group having from 0 to 5 carbon atoms). One species of the structural unit of formula (1) and/or (2) may be contained in one molecule, or two or more species of the structural unit of the formula (1) and/or (2) as a mixture therein.

In the above formulas (1) and (2), the plural number of "a", "b" and "X" may be the same or different from each other, respectively.

It also contains an another repeating structural unit (isocyanate residue) represented by the following formula (3) in a number "n":

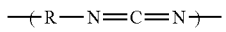

(wherein R means an alkyl group having from 4 to 20 carbon atoms or an aryl group) in one molecule.

The aforementioned m is an integer of 2 or more and generally 1,000 or less, and is preferably an integer of from 2 to 10. Also, n is an integer of 1 or more and generally 500 or less, and is preferably an integer of from 1 to 10. In this connection, m+n is from 3 to 1,500, preferably from 3 to 20, and m/(m+n) is from 1/1,500 to 1/3, preferably from 1/11 to 1/3.

Also, as the terminal structural unit, a substituted or unsubstituted aryl group, or an alkyl group can be cited. Examples of the unsubstituted aryl group include phenyl, naphthyl and the like. Typical examples of the aryl group having a substituent group include tolyl, isopropylphenyl, methoxyphenyl, chlorophenyl and the like.

In addition, examples in which the terminal structural unit is an alkyl group include n-butyl, n-hexyl, n-octyl and the like alkyl groups having from 1 to 10 carbon atoms.

(Production Method of Polycarbodiimide)

The polycarbodiimide copolymer of the present invention having the aforementioned structure is obtained by allowing a bifunctional liquid rubber to react with an organic diisocyanate in an aprotic solvent and then with an organic monoisocyanate for chain length control and a carbodiimide forming catalyst.

(Bifunctional Liquid Rubber)

According to the present invention, examples of the bifunctional liquid rubber for introducing the repeating structural unit of formula (1) and/or formula (2) include a liquid polybutadiene [the following formula (1); provided that c=0], a liquid polybutadiene-acrylonitrile copolymer [the following formula (1); provided that c≠0] and the like.

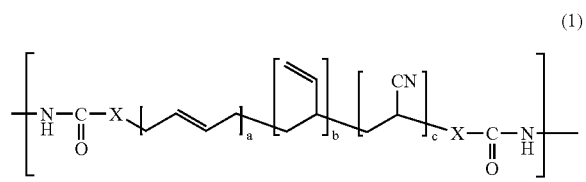

Also, as another bifunctional liquid rubber, a liquid hydrogenated polybutadiene [the following formula (2); provided that c=0] can be cited.

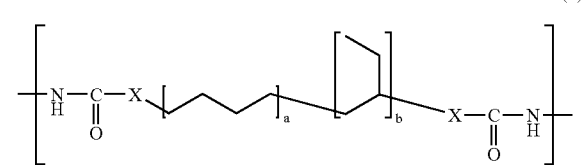

These may be used alone or as a mixture of two or more.

Examples of commercially available products of the aforementioned liquid polybutadiene include Hycar CTB (registered trademark) manufactured by Ube Industries, Nippon Soda C-1000 and the like. Also, examples of the liquid polybutadiene-acrylonitrile copolymer include Hycar CTBN (registered trademark) manufactured by Ube Industries [e.g., CTBN1300X13 or CTBN1300X8] and the like. In addition, examples of the liquid hydrogenated polybutadiene include Nippon Soda CI-1000 and the like. Also, these may be used by optionally modifying them.

(Organic Diisocyanate)

Aromatic and aliphatic diisocyanates can be used as the organic diisocyanate. These may be used alone or as a mixture of two or more. Amount of the organic diisocyanate to be used is from 10 to 1,000 moles, preferably from 20 to 500 moles, based on 100 moles of the aforementioned bifunctional liquid rubber.

(i) Structures represented by the following formulae (4) and (5) can be used as the aromatic isocyanate.

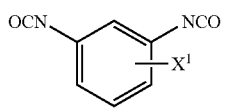

(In this formula, $X^1$ represents an alkyl group having from 1 to 5 carbon atoms, an alkoxyl group (preferably having from 1 to 2 carbon atoms) or a halogen.)

Illustrative examples of the diisocyanate having the structure of above formula (4) include m-phenylene diisocyanate, 2,4-tolylene diisocyanate, 2,6-tolylene diisocyanate, 6-methoxy-2,4-phenylene diisocyanate, 5-bromo-2,4-tolylene diisocyanate and the like.

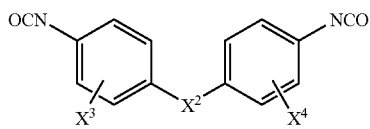

(In this formula, $X^2$ represents an alkylene group having from 0 to 5 carbon atoms, an oxy group, a sulfo group or a sulfoxyl group, and $X^3$ and $X^4$ respectively represent an alkyl group having from 1 to 5 carbon atoms, an alkoxyl group (preferably having from 1 to 2 carbon atoms) or a halogen.)

Illustrative examples of the diisocyanate having the structure of above formula (5) include 4,4'-diphenylmethane diisocyanate, 3,3',5,5'-tetraethyl-4,4'-diphenylmethane diisocyanate, 4,4'-diphenylisopropylidene diisocyanate, 4,4'-diphenylether diisocyanate, 4,4'-diphenylsulfide diusocyanate, 4,4'-diphenylsulfoxide diisocyanate, 3,3',5,5'-tetramethyl-4,4'-diphenyl diisocyanate, 3,3'-dimethoxy-4,4'-biphenyl diisocyanate, 3,3'-dibromo-4,4'-biphenyl diisocyanate and the like.

(ii) Also, diisocyanates having the structures represented by the following formula (6), the following formula (7) and the following formula (8) can be used as the aliphatic organic diisocyanate.

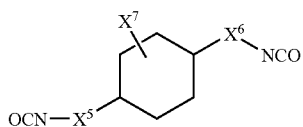

(In this formula, $X^5$ and $X^6$ respectively represent an alkylene group having from 0 to 5 carbon atoms, and $X^7$ represents an alkyl group having from 1 to 5 carbon atoms or an alkylene group having from 0 to 5 carbon atoms.)

Illustrative examples of the diisocyanate having the structure of above formula (5) include 4,4'-dicyclohexylmethane diisocyanate, norbornane diisocyanate, 4,4'-cyclohexane diisocyanate, isophorone diisocyanate, methylcyclohexane-2,4-diusocyanate, 2,4-bis(isocyanatomethyl)cyclohexane and the like.

(In this formula, $X^8$ represents an alkylene group having from 1 to 18 carbon atoms.)

Illustrative examples of the diisocyanate having the structure of above formula (7) include hexamethylene diisocyanate, 2,2,4-trimethylhexamethylene diisocyanate, octamethylene diisocyanate, dodecamethylene diisocyanate and the like.

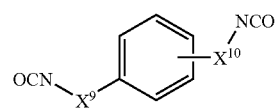

(In this formula, $X^9$ and $X^{10}$ respectively represent an alkylene group having from 0 to 5 carbon atoms.)

Illustrative examples of the diisocyanate having the structure of above formula (8) include xylene diisocyanate, α,α,α',α'-tetramethylxylylene diisocyanate, 4-isocyanatomethyl-phenyl isocyanate and the like.

(Monoisocyanate)

The monoisocyanate is used for controlling chain length of the copolymer of interest, and its examples include isocyanates having substituted or unsubstituted aryl groups such as phenyl isocyanate, naphthyl isocyanate, tolyl isocyanate, isopropylphenyl isocyanate, methoxyphenyl isocyanate, chlorophenyl isocyanate and the like; or alkyl isocyanates having from 1 to 10 carbon atoms such as n-butyl isocyanate, n-hexyl isocyanate, n-octyl isocyanate and the like.

It is desirable to use the monoisocyanate in an amount of from 1 to 10 moles based on 100 moles of the diisocyanate component. When the amount of monoisocyanate is smaller than this, molecular weight of the obtained polycarbodiimide may become too large, increase of the solution viscosity and solidification of the solution occur due to crosslinking reaction, and considerable reduction of storage stability of the polycarbodiimide solution may be generated. On the other hand, when the amount of monoisocyanate is larger than this, solution viscosity of the obtained polycarbodiimide solution may become so low that good films may not be formed by film molding through coating and drying of the solution.

(Catalyst)

Various substances can be used as the catalyst to be used in the polymerization reaction, but preferred are 3-methyl-1-phenyl-2-phosphorene-1-oxide, 1-phenyl-2-phosphorene-1-oxide, 1-phenyl-2-phosphorene-1-sulfide, 1-ethyl-3-methyl-2-phosphorene-1-oxide, 3-methyl-1-phenyl-1-phospha-3-cyclopentene-1-oxide, 2,5-dihydro-3-methyl-1-phenylphosphor-1-oxide, isomers corresponding thereto and 3-phosphorene. In addition, phosphine oxides such as triphenylphosphine oxide, tritolylphosphine oxide, bis(oxadiphenylphosphino)ethene and the like can also be used.

Amount of the catalyst is from 0.001 to 5% by mole based on the total isocyanate components. When the amount of use is smaller than this range, the polymerization requires a lot of time which is not practical, and when it exceeds this range on the other hand, the reaction becomes so quick that the product is solidified into a gel shape during the reaction and its storage stability is considerably reduced.

(Polymerization Reaction)

The polycarbodiimide copolymer of the present invention is obtained by carrying out polymerization reaction of a liquid chain rubber having carboxyl groups on both termini with a diisocyanate in an aprotic organic solvent at a temperature of from 10 to 150° C., preferably from 60 to 110° C., in the presence of a carbodiimide forming catalyst. When the polymerization temperature exceeds the above range, the reaction progresses too quickly, the product is solidified into a gel state during the reaction due to formation of a side reaction, and its storage stability is considerably reduced. Also, when the reaction temperature at the time of polymerization is lower than the above temperature range, it is not desirable because the reaction progresses too slowly and stability of the polycarbodiimide copolymer solution is lowered due to the isocyanate functional group remained in the solution.

The time of reaction is not particularly limited and may be appropriately decided by monitering the decrease in the N—C—O stretching vibration of the isocyanate and increase in the N—C—N stretching vibration of the carbodiimide. The time of reaction is generally from 30 min. to 150 min., preferably from 40 min. to 120 min., most preferably from 60 min. to 90 min.

A polycarbodiimide copolymer solution can be obtained by subjecting the polycarbodiimide copolymer of the present invention to a carbodiimide-forming reaction in an aprotic organic solvent. Examples of such an aprotic organic solvent include toluene, xylene, an alkyl toluene having from 3 to 5 carbon atoms in the alkyl moiety thereof, benzene, an alkyl benzene having from 3 to 36 carbon atoms in the alkyl moiety thereof, naphthalene, tetrahydrofuran, dioxane, acetone, butanone, cyclohexanone, N-methylpyrrolidone, N,N-dimethylformamide, N,N-dimethylacetamide and the like. These solvents may be used alone or as a mixture of two or more. In addition, these may be contaminated with a component which is not concerned in the reaction.

The solvent may be used in such an amount that concentration of the polycarbodiimide copolymer in the polymer solution becomes from 1 to 90% by weight based on the total weight of the polymer solution. When concentration of the solid polymer content exceeds 90% by weight, the viscosity becomes high and storage stability of the solution also becomes poor. In addition, when its concentration becomes less than 1% by weight, it is necessary to remove a large amount of the solvent at the time of molding of the obtained polymer, which is not practical.

In a typical production method of the present invention, 70 parts by weight of a liquid rubber component, 30 parts by weight of tolylene diisocyanate and 2 parts by mole of 1-naphthyl isocyanate based on tolylene diisocyanate are mixed in toluene solvent, the mixture is stirred at 50° C. for 1 hour, and then a carbodiimide forming catalyst is added to the mixture. The temperature is increased to 100° C. while confirming progress of the reaction by an infrared spectrophotometry, and the carbodiimide forming reaction is carried out at this temperature for 2 hours.

The following describes the present invention further illustratively with reference to examples.

EXAMPLE 1

Figure 2:
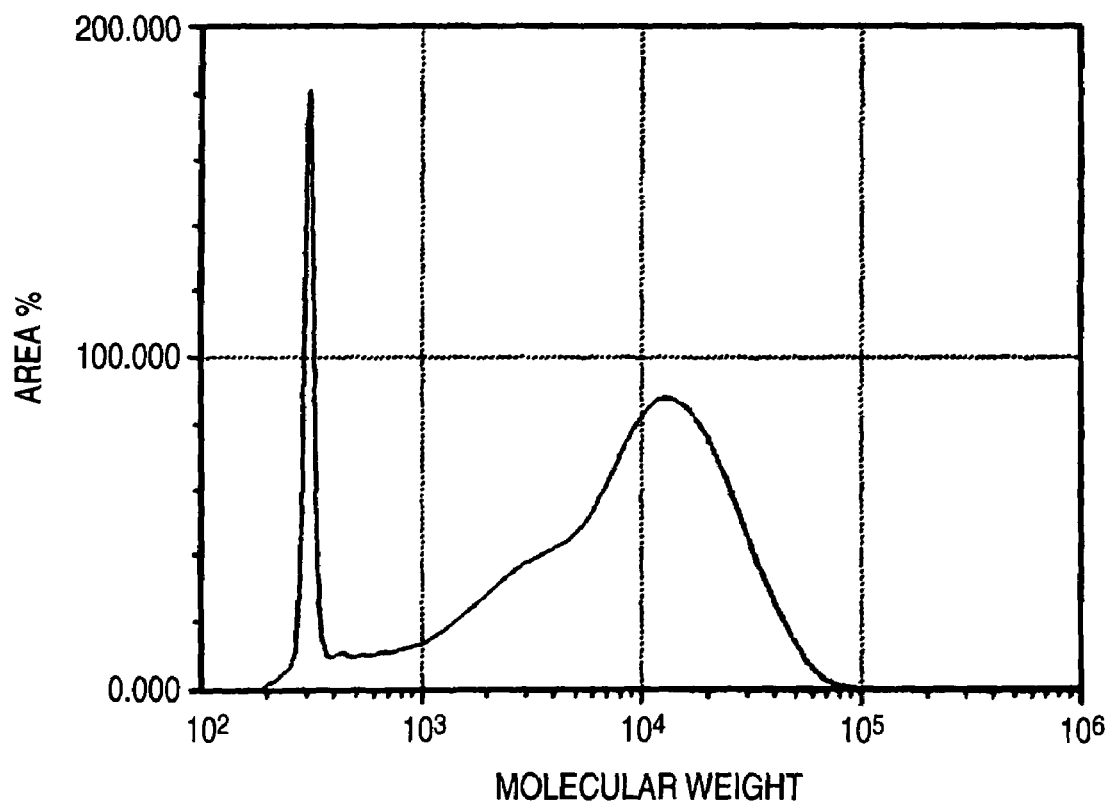
FIG. 2 is a chart showing a result of GPC analysis of the polymer obtained in Example 1.

A 42.5 g (244 mmol) portion of TDI (a mixture of 80% 2,4-TDI and 20% 2,6-TDI) was mixed with 61.1 g (244 mmol) of 4,4'-diphenylmethane diisocyanate, 48.7 g of CTBN1300X13 (Ube Industries) and 226 g of toluene. This was kept for 1 hour while stirring at 40° C. After confirming progress of the reaction by an infrared spectrophotometry, 8.3 g (49 mmol) of 1-naphthyl isocyanate and 1.88 g (9.7 mmol) of 3-methyl-1-phenyl-2-phosphorene-1-oxide were added thereto, and then temperature of the reaction mixture was increased to 80° C. Progress of the reaction was confirmed by the infrared spectrophotometry. Concretely, decrease in the N—C—O stretching vibration (2270 cm$^{-1}$) of the isocyanate and increase in the N—C—N stretching vibration (2135 cm$^{-1}$) of the carbodiimide were observed. While stirring, the thus obtained polycarbodiimide solution was added dropwise to 1 liter of heptane, and the thus formed precipitate was collected and dried to obtain 122 g of the polymer. An IR absorption spectrum of the thus obtained polymer and a result of its GPC analysis are respectively shown in FIG. 1 and FIG. 2.

The solvent toluene was removed from the thus obtained polycarbodiimide solution under conditions of a reduced pressure of 10 mmHg, at 80° C. and for 1 hour, and the residual solid was hydrolyzed with potassium hydroxide aqueous solution by the method described in *J. Appl. Polym. Sci.*, 14, 35 (1970) and then extracted with ether. Tolylenediamine and 4,4'-diphenylmethanediamine in the ether phase were determined using a gas chromatograph-mass spectrometer (GC-MS). For the determination, a calibration curve was prepared using respective standard samples. It was confirmed by this that amounts of tolylenediamine and 4,4'-diphenylmethanediamine were at a ratio of 50:50, and weight fraction of the structure originated from each diamine in the solid matter was 68%. Thus, it was confirmed that the ratio of structural units [m/m+n] was 1/45.4. Based on this ratio and a result that the weight average molecular weight obtained by analyzing the polycarbodiimide solution using a GPC was $1.3 \times 10^4$, it was able to confirm that m+n was 53.8.

Since the aromatic-aliphatic copolymer polycarbodiimide of the present invention shows improved flexibility without reducing the heat resistance inherent to polycarbodiimide, films and molding materials having high heat resistance can be provided. In addition, it can be provided under a semi-hardened filmy state. Accordingly, it can be applied to the field for preparing heat-resistant adhesives for precision electronics, composite films by laminating and the like, which were difficult to achieve in the prior art.

While the invention has been described in detail and with reference to specific embodiments thereof, it will be apparent to one skilled in the art that various changes and modifications can be made therein without departing from the scope thereof.

This application is based on Japanese patent application No. 2003-062523 filed Mar. 7, 2003, the entire contents thereof being hereby incorporated by reference.

What is claimed is:

1. A polycarbodiimide copolymer which comprises at least one structural unit selected from rubber residues represented by the following formulae (1) and (2) in a number "m":

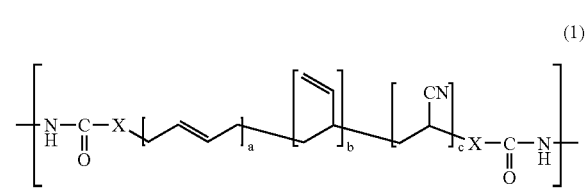

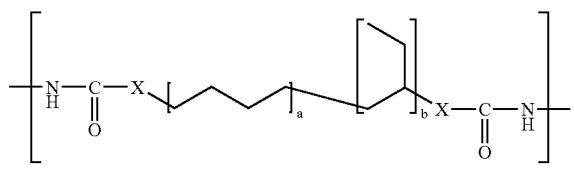

(2)

(wherein each of a, b and c is an integer of from 0 to 200, and X represents an alkylene group having from 0 to 5 carbon atoms) and a structural unit represented by the following formula (3) in a number "n":

(3)

(wherein R means an alkyl group having from 4 to 20 carbon atoms or an aryl group) and which comprises on each of the both termini a terminal structural unit derived from a monoisocyanate, wherein m is an integer of 2 or more, n is an integer of 1 or more, m+n is from 3 to 1,500 and m/(m+n) is from 1/1,500 to 1/3.

2. The polycarbodiimide copolymer according to claim 1, wherein the terminal structural unit is a substituted or unsubstituted phenyl group, naphthyl group or alkyl group having from 1 to 10 carbon atoms.

3. A polycarbodiimide copolymer solution prepared by dissolving the polycarbodiimide copolymer of claim 1 in an aprotic organic solvent.

4. A method for producing a polycarbodiimide copolymer, which comprises allowing at least one bifunctional liquid rubber selected from liquid rubbers having repeating structural units represented by the following formulae (1) and (2):

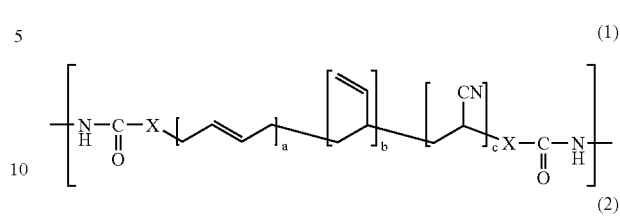

(1)

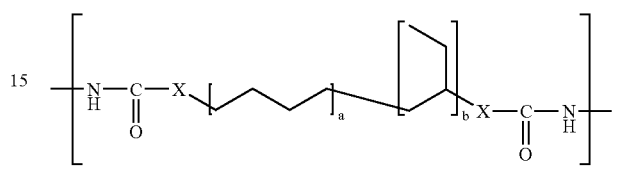

(2)

(wherein each of a, b and c is an integer of from 0 to 200, and X represents an alkylene group having from 0 to 5 carbon atoms), an organic diisocyanate and a monoisocyanate to undergo the reaction in an aprotic solvent in the presence of a catalyst.

5. The method for producing a polycarbodiimide copolymer according to claim 4, wherein the aprotic solvent is at least one solvent selected from toluene, xylene, an alkyl toluene having from 3 to 5 carbon atoms in the alkyl moiety thereof, benzene, an alkyl benzene having from 3 to 36 carbon atoms in the alkyl moiety thereof, naphthalene, tetrahydrofuran, dioxane, acetone, butanone, cyclohexanone, N-methylpyrrolidone, N,N-dimethylformamide and N,N-dimethylacetamide.

* * * * *

UNITED STATES PATENT AND TRADEMARK OFFICE
CERTIFICATE OF CORRECTION

| | | |
|---|---|---|
| PATENT NO. | : 7,034,101 B2 | Page 1 of 1 |
| APPLICATION NO. | : 10/793213 | |
| DATED | : April 25, 2006 | |
| INVENTOR(S) | : Naoki Sadayori and Yuki Hotta | |

It is certified that error appears in the above-identified patent and that said Letters Patent is hereby corrected as shown below:

Column 6, line 47, delete "phosphorene" and insert therefore --phospholene-- (two instances).

Column 6, line 48, delete "phosphorene" and insert therefore --phospholene--.

Column 6, line 49, delete "phosphorene" and insert therefore --phospholene--.

Column 6, line 52, delete "phosphorene" and insert therefore --phospholene--.

Column 7, line 64, delete "phosphorene" and insert therefore --phospholene--.

Signed and Sealed this

Twenty-fifth Day of July, 2006

JON W. DUDAS
*Director of the United States Patent and Trademark Office*